(12) United States Patent
Fan et al.

(10) Patent No.: US 9,736,156 B2
(45) Date of Patent: Aug. 15, 2017

(54) WLAN USER FIXED NETWORK ACCESSING METHOD AND SYSTEM

(71) Applicant: ZTE Corporation, Shenzhen, Guangdong (CN)

(72) Inventors: Liang Fan, Shenzhen (CN); Yong Chen, Shenzhen (CN); Qiandeng Liang, Shenzhen (CN); Bo Yuan, Shenzhen (CN)

(73) Assignee: ZTE CORPORATION, Shenzhen, Guangdong (CN)

( * ) Notice: Subject to any disclaimer, the term of this patent is extended or adjusted under 35 U.S.C. 154(b) by 107 days.

(21) Appl. No.: 14/430,819

(22) PCT Filed: Aug. 14, 2013

(86) PCT No.: PCT/CN2013/081488
§ 371 (c)(1),
(2) Date: Mar. 24, 2015

(87) PCT Pub. No.: WO2014/044098
PCT Pub. Date: Mar. 27, 2014

(65) Prior Publication Data
US 2015/0244723 A1    Aug. 27, 2015

(30) Foreign Application Priority Data
Sep. 24, 2012  (CN) .......................... 2012 1 0358289

(51) Int. Cl.
*H04W 84/12* (2009.01)
*H04L 29/06* (2006.01)
(Continued)

(52) U.S. Cl.
CPC .......... *H04L 63/0892* (2013.01); *H04W 8/20* (2013.01); *H04W 12/06* (2013.01); *H04W 48/18* (2013.01);
(Continued)

(58) Field of Classification Search
CPC ...... H04W 84/12; H04W 88/08; H04W 88/16
See application file for complete search history.

(56) References Cited

U.S. PATENT DOCUMENTS

2007/0249323 A1* 10/2007 Lee ........................ G06F 21/33
455/411
2008/0101291 A1* 5/2008 Jiang ...................... H04L 63/08
370/331
(Continued)

FOREIGN PATENT DOCUMENTS

CN          1549526 A      11/2004
CN        102202001 A       9/2011
(Continued)

OTHER PUBLICATIONS

International Search Report in international application No. PCT/CN2013/081488, mailed on Nov. 21, 2013.
(Continued)

*Primary Examiner* — Ellen Tran
(74) *Attorney, Agent, or Firm* — Oppedahl Patent Law Firm LLC

(57) ABSTRACT

A method for a Wireless Local Area Network (WLAN) user to access a fixed network is disclosed, which includes: after the WLAN user is authenticated successfully, a Broadband Network Gateway (BNG) sends obtained user subscription information to a WLAN device; and after the WLAN device performs related configuration according to the user subscription information, a WLAN user terminal accesses a network. A system for a WLAN user to access a fixed network is also disclosed. The present disclosure can solve the problem that a WLAN network cannot perceive the user subscription information and further cannot provide differentiated services based on different users and different subscription information because a WLAN user passes through BNG authentication.

12 Claims, 5 Drawing Sheets

After a WLAN user is authenticated successfully, a BNG sends obtained user subscription information to a WLAN device — 401

After the WLAN device performs related configuration according to the user subscription information, a WLAN user terminal accesses a network — 402

(51) Int. Cl.
*H04W 48/18* (2009.01)
*H04W 8/20* (2009.01)
*H04W 12/06* (2009.01)
H04W 12/04 (2009.01)
H04W 88/08 (2009.01)
H04W 88/16 (2009.01)

(52) U.S. Cl.
CPC ............ *H04W 12/04* (2013.01); *H04W 84/12* (2013.01); *H04W 88/08* (2013.01); *H04W 88/16* (2013.01)

(56) References Cited

U.S. PATENT DOCUMENTS

2008/0209491 A1* 8/2008 Hasek ................ H04N 7/17318
 725/114
2011/0173678 A1 7/2011 Kaippallimalil
2011/0283344 A1* 11/2011 Krishnan ................ H04L 63/08
 726/5
2012/0265888 A1 10/2012 Roeland

FOREIGN PATENT DOCUMENTS

CN 102388639 A 3/2012
WO 2011082895 A1 7/2011

OTHER PUBLICATIONS

English Translation of the Written Opinion of the International Search Authority in international application No. PCT/CN2013/081488, mailed on Nov. 21, 2013.
Supplementary European Search Report in European application No. 13839253.5, mailed on Oct. 27, 2015.
Technical Specification Group Services and System Aspects 3GPP System-Fixed Broadband Access Network Interworking ,mailed on Jul. 2011.

* cited by examiner

WLAN USER FIXED NETWORK ACCESSING METHOD AND SYSTEM

TECHNICAL FIELD

The present disclosure relates to the technical field of data communication network, and in particular to a method and system for a Wireless Local Area Network (WLAN) user to access a fixed network.

BACKGROUND

With the rapid development of Internet application and intelligent terminal, the requirement of users for accessing, through various intelligent terminals, such as smart phone and tablet computer, the Internet to work anytime and anywhere is widely popularized, one of the most important methods is that users access a network through a WLAN network.

As shown in FIG. 1, a traditional WLAN network includes an Access Point (AP), an Access Controller (AC), an Authentication, Authorization and Accounting (AAA) server and other network elements; a user terminal, after being authenticated by the AAA server, can access a network through the AP and the AC; the AC manages and controls the AP device through a Control And Provisioning of Wireless Access Points Protocol (CAPWAP). With the development of network convergence trend, convergence of the WLAN network and a fixed broadband network becomes one of future mainstream trends; as shown in FIG. 2 and FIG. 3, all types of user terminals access the fixed broadband network through the WLAN network and a wired link; user authentication and service control are performed by a Broadband Network Gateway (BNG), and the AC of the WLAN network only takes charge of management and service configuration of the AP. In the meantime, the requirement of emerging Internet applications to network quality becomes higher and higher, operators put forward higher requirements for safety and quality of service of the WLAN network, and require that the WLAN network can provide bandwidth assurance, security encryption and other functions, and can provide different levels of services based on subscription situations of different users. Under the situation that the BNG device uniformly performs WLAN and wired broadband user authentication, the AC cannot perceive user subscription situation, which causes that the WLAN network cannot provide security and bandwidth assurance and other functions based on user subscription information.

SUMMARY

In view of this, the present disclosure provides a method and a system for a WLAN user to access a fixed network, for at least solving the problem that a WLAN network cannot perceive user subscription information and further cannot provide differentiated services based on different users and different subscription information because a WLAN user passes through BNG authentication.

The technical solutions of the present disclosure are implemented as follows.

The present disclosure provides a method for a WLAN user to access a fixed network, including:

after the WLAN user is authenticated successfully, a BNG sends obtained user subscription information to a WLAN device; and after the WLAN device performs related configuration according to the user subscription information, a WLAN user terminal accesses a network.

Preferably, before the authentication of the WLAN user, the method may further include:

configuring the BNG as an authentication server end, and configuring the WLAN device as an authentication client end.

Preferably, the WLAN device may be an AC or an AP.

Preferably, after the WLAN user is authenticated successfully, while the BNG sends the obtained user subscription information to the WLAN device, the method may further include:

the BNG sends the user subscription information to the WLAN user terminal through an Extensible Authentication Protocol (EAP) authentication success message.

Preferably, when the WLAN device is the AC, the BNG sending the obtained user subscription information to the WLAN device may include: the BNG confirms the AC to which the WLAN user terminal belongs, and sends the user subscription information to the AC through a Radius CoA message or a Diameter CCA message; and the AC sends the user subscription information to the AP by means of CAPWAP or Technical Report-069 (TR-069); or, when the WLAN device is the AP, the BNG sending the obtained user subscription information to the WLAN device may include: the BNG confirms the AP to which the WLAN user terminal belongs, and sends the user subscription information to the AP through the Radius CoA message or the Diameter CCA message.

Preferably, the BNG confirming the AC or the AP to which the WLAN user terminal belongs may include: the BNG confirms the AC or the AP to which the WLAN user terminal belongs through a Media Access Control (MAC) address of the WLAN user terminal and/or user side logical interface or physical port information of the BNG.

Preferably, the WLAN device performing related configuration according to the user subscription information may include:

the AP performs a bandwidth and priority configuration of an air interface according to a user subscription bandwidth and a priority in the user subscription information; and, the AP and the WLAN user terminal conduct a key negotiation according to an encryption key in the user subscription information to obtain an encryption key PTK;

the encryption key is a Pre-shared Key (PSK) or a Pairwise Master Key (PMK).

Preferably, after the WLAN device performs related configuration according to the user subscription information, the method may further include: the WLAN user terminal applies to the BNG for an IP address through a Dynamic Host Configuration Protocol (DHCP) protocol, and accesses a network after obtaining the IP address; or, before the WLAN user authentication, the method may further include: the WLAN user terminal applies to the BNG for an IP address through the DHCP protocol.

Preferably, after the WLAN user accesses a network, the method may further include:

the WLAN user accesses a portal server, and changes the user subscription information on line;

the portal server sends the changed user subscription information to an AAA server; and the AAA server sends the changed user subscription information to the BNG through the Radius CoA message or the Diameter CCA message.

Preferably, the method may further include: the BNG sends the changed user subscription information to the WLAN device, specifically including:

when the WLAN device is the AC, the BNG sends the changed user subscription information to the AC through the Radius CoA message or the Diameter CCA message; and, the AC sends the user subscription information to the AP by means of CAPWAP or TR-069; or, when the WLAN device is the AP, the BNG sends the changed user subscription information to the AP through the Radius CoA message or the Diameter CCA message.

The present disclosure also provides a system for a WLAN user to access a fixed network, including: a BNG and a WLAN device;

the BNG is configured to, after the WLAN user authentication is successful, send the obtained user subscription information to the WLAN device; and the WLAN device is configured to perform related configuration according to the user subscription information.

Preferably, the BNG is further configured to, after the WLAN user authentication is successful, send the user subscription information to the WLAN user terminal through the EAP authentication success message while sending the obtained user subscription information to the WLAN device.

Preferably, when the WLAN device is the AC, the BNG is further configured to confirm the AC to which the WLAN user terminal belongs, and send the user subscription information to the AC through the Radius CoA message or the Diameter CCA message; the AC is configured to send the user subscription information to the AP by means of CAPWAP or TR-069; or when the WLAN device is the AP, the BNG is further configured to confirm the AP to which the WLAN user terminal belongs, and send the user subscription information to the AP through the Radius CoA message or the Diameter CCA message.

Preferably, the BNG is further configured to confirm the AC or the AP to which the WLAN user terminal belongs through the MAC address of the WLAN user terminal and/or the user side logical interface or physical port information of the BNG.

Preferably, the AP is further configured to perform a bandwidth and priority configuration of an air interface according to the user subscription bandwidth and priority in the user subscription information, and conduct key negotiation with the WLAN user terminal according to an encryption key in the user subscription information to obtain the encryption key PTK;

the encryption key is the PSK or the PMK.

Preferably, after the user subscription information is changed, when the WLAN device is the AC, the BNG is further configured to send the changed user subscription information to the AC through the Radius CoA message or the Diameter CCA message; the AC is further configured to send the user subscription information to the AP by means of CAPWAP or TR-069;

or when the WLAN device is the AP, the BNG is further configured to send the changed user subscription information to the AP through the Radius CoA message or the Diameter CCA message.

The present disclosure provides a method and a system for a WLAN user to access a fixed network, wherein the method includes: after the WLAN user is authenticated successfully, a BNG sends the obtained user subscription information to a WLAN device; and after the WLAN device performs related configuration according to the user subscription information, a WLAN user terminal accesses a network. Thus, the problem that a WLAN network cannot perceive the user subscription information and further cannot provide differentiated services based on different users and different subscription information because a WLAN user passes through BNG authentication can be solved. The means that the WLAN device performs related configuration according to the user subscription information can provide different levels of services for different users in a WLAN network and a fixed broadband converged network, thereby improving the quality of service of WLAN services and the flexibility of service bundles.

DETAILED DESCRIPTION

Figure 4:
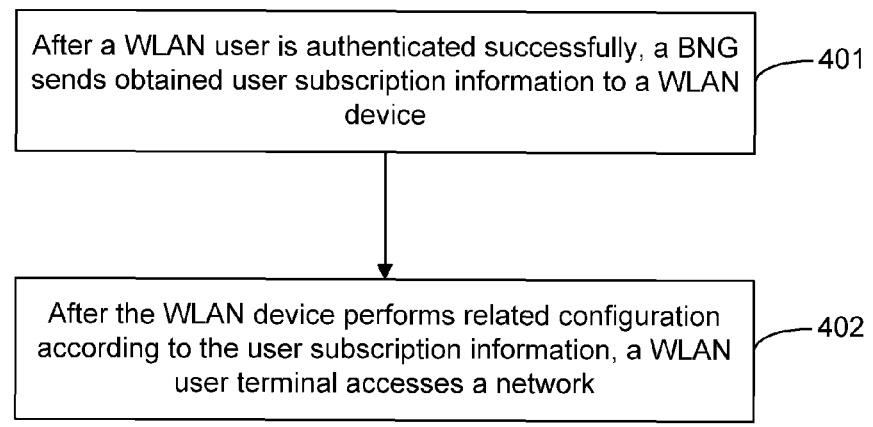
FIG. 4 is a flowchart of WLAN user fixed network access in an embodiment of the present disclosure.

The present present disclosure provides a method for a WLAN user to access a fixed network; as shown in FIG. 4, the method includes the following steps:

Step 401: after WLAN user authentication is successful, a BNG sends obtained user subscription information to a WLAN device; and Step 402: after the WLAN device performs related configuration according to the user subscription information, a WLAN user terminal accesses a network.

Preferably, before performing the WLAN user authentication, the method further includes: the BNG is configured as an authentication server end, and the WLAN device is configured as an authentication client end. A Radium protocol, or a Diameter protocol, or a Tacacs protocol can be configured as an authentication protocol between the BNG and the WLAN device.

Preferably, the WLAN device is an AC or an AP.

Preferably, after the WLAN user authentication is successful, while the BNG sends the obtained user subscription information to the WLAN device, the method further includes: the BNG sends the user subscription information to the WLAN user terminal through an EAP authentication success message.

Preferably, when the WLAN device is the AC, the BNG sending the obtained user subscription information to the WLAN device includes: the BNG confirms the AC to which the WLAN user terminal belongs, and sends the user subscription information to the AC through a Radius attribute change CoA message or a Diameter CCA message; and the AC sends the user subscription information to the AP by means of CAPWAP or CPE network management protocol TR-069 (one of the technical reports from the Broadband Forum); or, when the WLAN device is the AP, the BNG sending the obtained user subscription information to the WLAN device includes: the BNG confirms the AP to which the WLAN user terminal belongs, and sends the user subscription information to the AP through the Radius CoA message or the Diameter CCA message.

Preferably, the BNG confirming the AC or the AP to which the WLAN user terminal belongs includes: the BNG confirms the AC or the AP to which the WLAN user terminal belongs through a MAC address of the WLAN user terminal and/or user side logical interface or physical port information of the BNG.

Preferably, the WLAN device performing related configuration according to the user subscription information includes:

the AP performs a bandwidth and priority configuration of an air interface according to the user subscription bandwidth and priority in the user subscription information; and, the AP and the WLAN user terminal conduct key negotiation according to an encryption key in the user subscription information to obtain the encryption key PTK; wherein, the encryption key is the PSK or the PMK.

Preferably, after the WLAN device performs related configuration according to the user subscription information, the method further includes: the WLAN user terminal applies to the BNG for an IP address through the DHCP protocol, and accesses a network after obtaining the IP address; or, before the WLAN user authentication, the method further includes: the WLAN user terminal applies to the BNG for an IP address through the DHCP protocol.

Preferably, after the WLAN user accesses a network, the method further includes:

the WLAN user accesses a portal server, and changes the user subscription information on line;

the portal server sends the changed user subscription information to an AAA server; here, the user subscription information can be sent by using a private protocol message between the portal server and the AAA server;

the AAA server sends the changed user subscription information to the BNG through the Radius CoA message or the Diameter CCA message.

Preferably, the method further includes: the BNG sends the changed user subscription information to the WLAN device, specifically including:

when the WLAN device is the AC, the BNG sends the changed user subscription information to the AC through the Radius CoA message or the Diameter CCA message; and, the AC sends the user subscription information to the AP by means of CAPWAP or TR-069; or, when the WLAN device is the AP, the BNG sends the changed user subscription information to the AP through the Radius CoA message or the Diameter CCA message.

Wherein, the BNG includes Broadband Remote Access Server (BRAS), Service Router (SR), Network Access Server (NAS) and so on.

By using the method above, different levels of services can be provided for different users in the WLAN network and the fixed broadband converged network, thereby improving the quality of service of WLAN services and the flexibility of service bundles The above technical solutions of the present disclosure are elaborated through specific embodiments.

Embodiment 1

Figure 1:
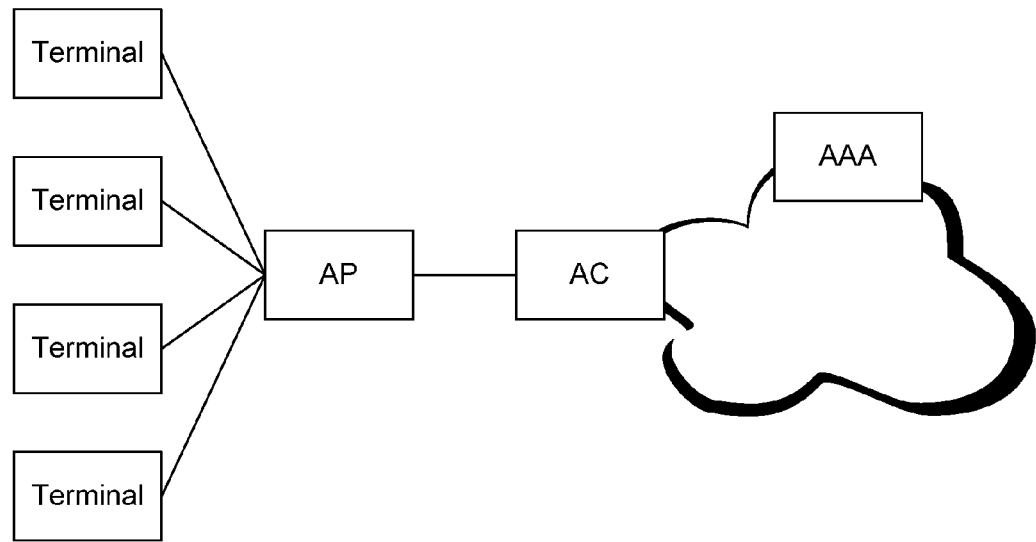
FIG. 1 is a topological diagram of a traditional WLAN network.
Figure 2:
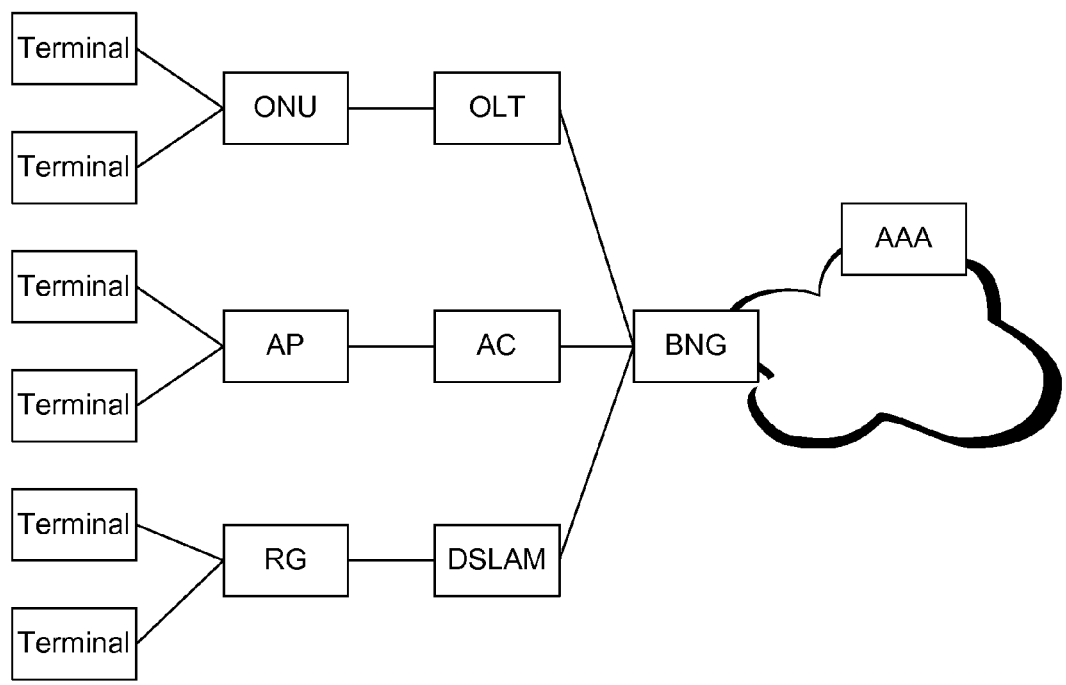
FIG. 2 is a network topology diagram of a convergence mode of a WLAN network and a fixed broadband network.
Figure 5:
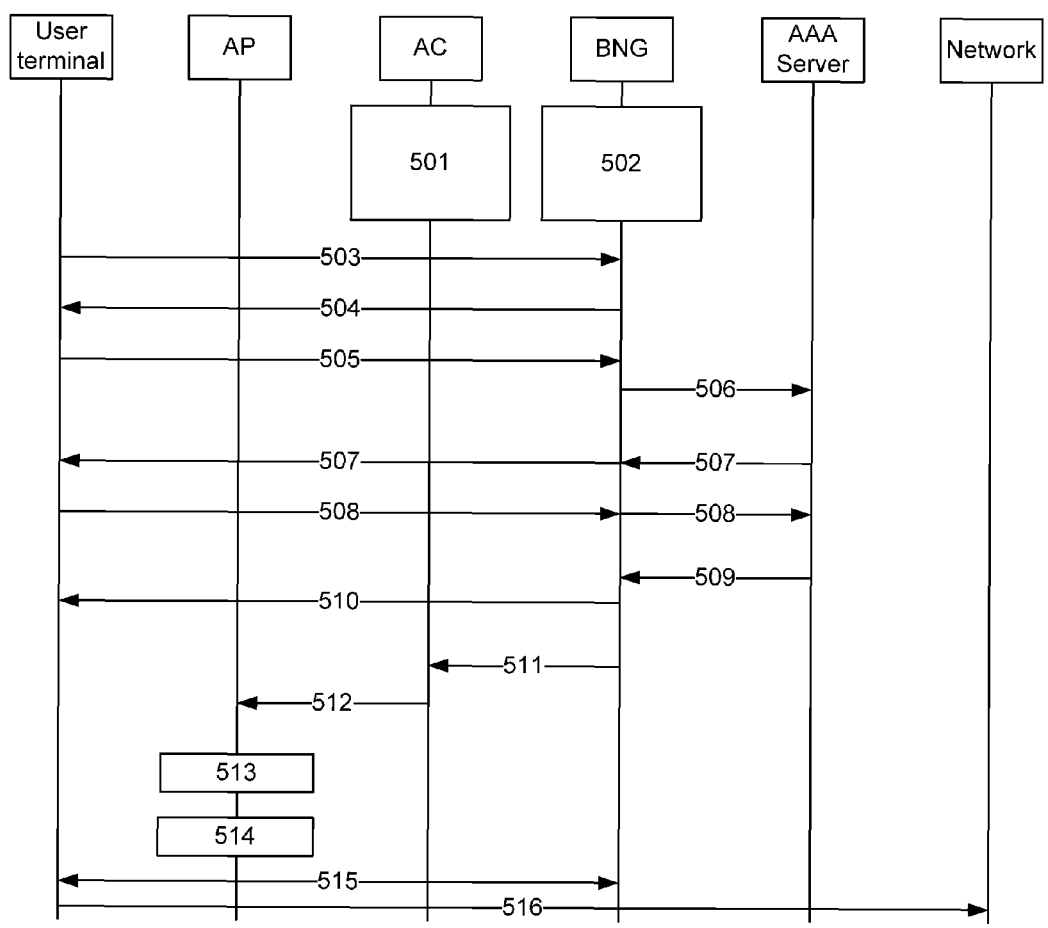
FIG. 5 is a flowchart of a first embodiment of the present disclosure.

A scenario that the embodiment is applicable is shown in FIG. 2; the AC is between the AP and the BNG; a data message after the successful user authentication flows through the AC, and the WLAN device is the AC; as shown in FIG. 5, the flow of WLAN user fixed network access includes the following steps.

Step 501: The following configurations are performed in the AC: configuring the AC as the authentication client end, and configuring the BNG as the authentication server end of the AC.

Step 502: The following configurations are performed in the BNG: configuring the BNG as the authentication server end, and configuring the AC as the authentication client end of the BNG.

Step 501 and Step 502 are executed in a random order.

Step 503: The user terminal (namely the WLAN user) sends an EAPoL-Start message to the BNG, so as to initiate an authentication request.

Step 504: The BNG sends an EAP-Request/Identity message to the user terminal, so as to require the user terminal to report a user name.

Step 505: The user terminal sends an EAP-Response/Identity message to the BNG, wherein the message includes the user name.

Step 506: The BNG encapsulates the EAP-Response/Identity message into a RADIUS Access-Request message to send to the AAA server.

Step 507: The AAA server generates a Challenge, and sends the Challenge to the BNG through a RADIUS Access-Challenge message to the BNG; the BNG extracts the Challenge from the RADIUS Access-Challenge message, and then sends it to the user terminal through an EAP-Request/MD5-Challenge message.

Step 508: The user terminal extracts the Challenge after receiving the EAP-Request/MD5-Challenge message, and performs MD5 calculation to its own user password and the Challenge to obtain an encrypted user password, namely Challenged-Pass-word; then, the user terminal carries the Challenged-Pass-word in the EAP-Request/MD5-Challenge message to send to the BNG; the BNG sends the Challenge, the Challenged-Pass-word and the user name to the AAA server through the Radius message.

Here, the Challenge, the Challenged-Pass-word and the user name are authentication information of user.

Step 509: After receiving the Radius message, the AAA server extracts the authentication information of user to perform MD5 calculation, so as to determine whether the user is valid; if the user is valid, the AAA server sends an authentication success message to the BNG, wherein the authentication success message carries the user subscription information; or else, the AAA server sends an authentication failure message to the BNG, and the flow ends.

Wherein, the user subscription information includes: user subscription bandwidth, priority and encryption key, wherein the encryption key is the PSK or the PMK.

Step 510: After receiving the authentication success message, the BNG extracts the user subscription information from it, and sends the user subscription information to the user terminal trough the EAP authentication success message.

Step 511: The BNG confirms the AC to which the user terminal belongs through the MAC address of the user terminal and/or the user side logical interface information (here, the user side logical interface can also be the user side physical port) of the BNG; then, the BNG sends the user subscription information to the AC through the Radius CoA message or the Diameter CCA message.

Step 512: The AC sends the user subscription information to the AP by means of CAPWAP or TR-069.

Step 513: The AP configures according to the user subscription information; specifically, the AP performs a bandwidth and priority configuration of an air interface according to the user subscription bandwidth and priority.

Step 514: The AP and the user terminal conduct key negotiation according to the encryption key (PSK or PMK) to obtain the encryption key PTK, wherein the encryption key PTK is used for encrypting data flow between the AP and the user terminal.

Furthermore, the AP can also generate an encryption key GMK according to the PMK to send to the user terminal, and then conducts with the terminal to obtain an encryption key GTK for encrypting a multicast message.

Step 515: The user terminal applies to the BNG for an IP address through the DHCP protocol; the BNG sends an accounting start request to the AAA server while assigning the IP address to the user terminal; the AAA server responds accounting start success to the BNG, and the BNG sends the IP address to the user terminal.

Step 516: The user accesses a network.

Embodiment 2

Figure 3:
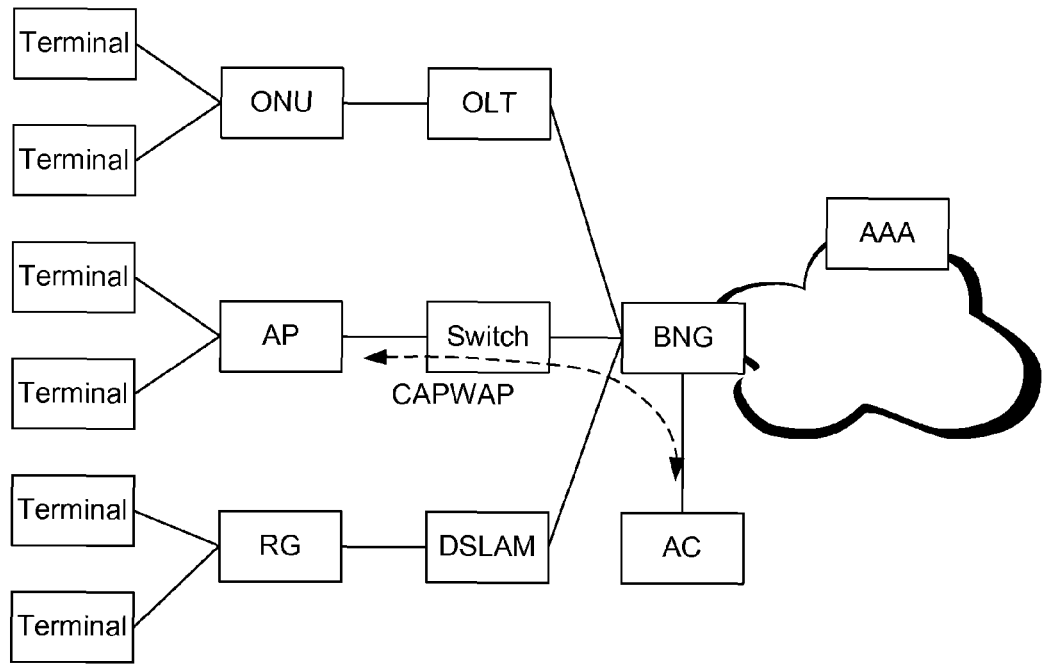
FIG. 3 is a network topology diagram of another convergence mode of a WLAN network and a fixed broadband network.
Figure 6:
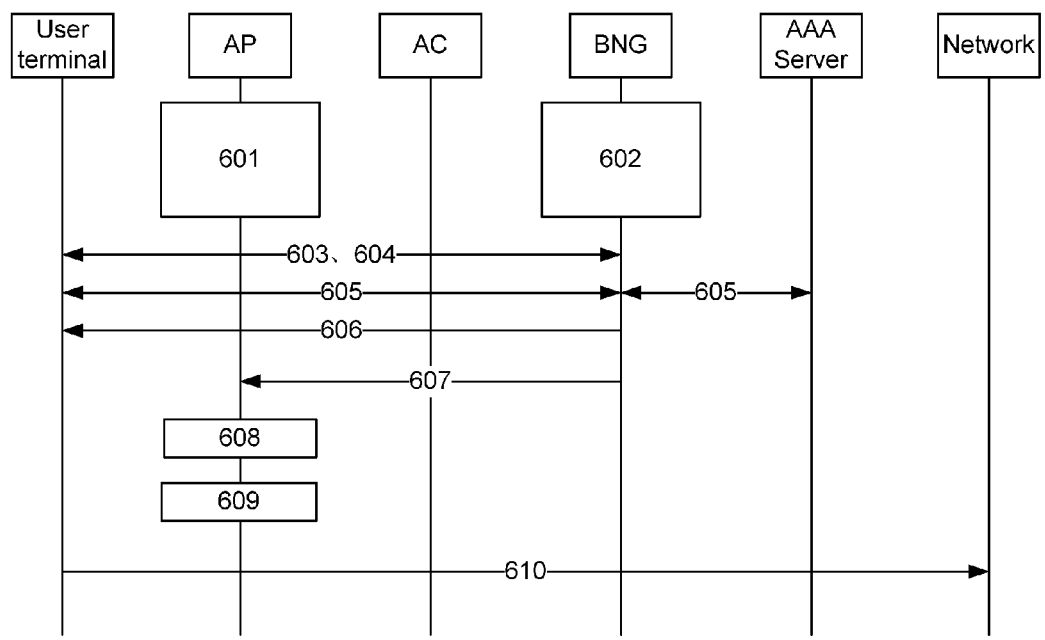
FIG. 6 is a flowchart of a second embodiment of the present disclosure.

A scenario that the embodiment is applicable is shown in FIG. 3; the AP and the AC are connected through a BRAS device; the AC controls that the message of the AP is forwarded through the BRAS; the user accesses the message of a network side not through the AC; the WLAN device is the AP; as shown in FIG. 6, the flow of WLAN user fixed network access includes the following steps.

Step 601: The following configurations are performed in the AP: configuring the AP as the authentication client end, and configuring the BNG as the authentication server end of the AP.

Step 602: The following configurations are performed in the BNG: configuring the BNG as the authentication server end, and configuring the AP as the authentication client end of the BNG.

Step 601 and Step 602 are executed in a random order.

Step 603 to Step 604: The user terminal obtains an IP address form the BNG through the DHCP protocol; and the user accesses the message of the network side by redirecting to the portal server through the BNG device.

Step 605: The user authentication is performed among the user terminal, the portal server, the BNG and the AAA server;

specifically, the user terminal accesses the portal server to input a user name and a password; the portal server sends the user name and the password to the AAA server; and the AAA server informs the BNG of successful user authentication after the user authentication is successful.

Step 606: After receiving the authentication success message, the BNG extracts the user subscription information from it, and sends the user subscription information to the user terminal through the EAP authentication success message.

Step 607: The BNG confirms the AP to which the user terminal belongs through the MAC address of the user terminal and/or the user side logical interface information (here, the user side logical interface can also be the user side physical port) of the BNG; then, the BNG sends the user subscription information to the AP through the Radius CoA message or the Diameter CCA message.

Step 608: The AP configures according to the user subscription information; specifically, the AP performs a bandwidth and priority configuration of an air interface according to the user subscription bandwidth and priority.

Step 609: The AP and the user terminal conduct key negotiation according to the encryption key (PSK or PMK) to obtain the encryption key PTK, wherein the encryption key PTK is used for encrypting data flow between the AP and the user terminal.

Furthermore, the AP can also generate the encryption key GMK according to the PMK to send to the user terminal, and then conducts with the terminal to obtain the encryption key GTK for encrypting a multicast message.

Step 610: The user accesses a network.

Embodiment 3

Figure 7:
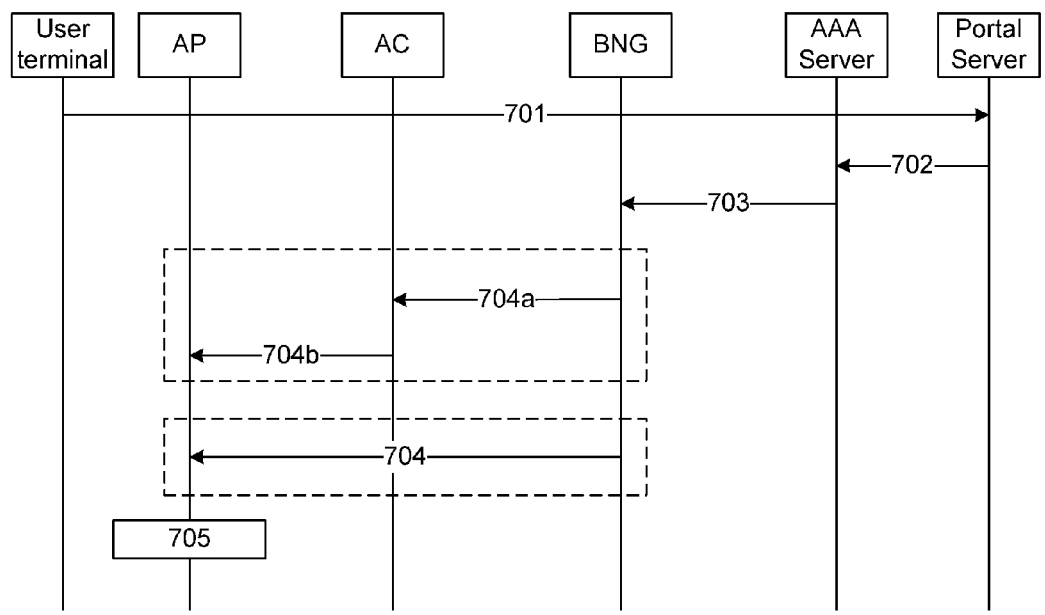
FIG. 7 is a flowchart of a third embodiment of the present disclosure.

After accessing a network, the user changes the user subscription information on line by accessing the portal server; the process that the AP acquires the user subscription information is shown in FIG. 7, including:

Step 701: The user accesses the portal server, and changes the user subscription information (such as the user subscription bandwidth and priority) on line.

Step 702: The portal server sends the changed user subscription information to the AAA server;

here, the user subscription information can be sent by using the private protocol message between the portal server and the AAA server.

Step 703: The AAA server sends the changed user subscription information to the BNG through the Radius CoA message or the Diameter CCA message.

Subsequently, there are two ways that the BNG sends the changed user subscription information to the AP.

1. When the WLAN device is the AC, the way includes:

Step 704a: the BNG sends the changed user subscription information to the AC through the Radius CoA message or the Diameter CCA message;

Step 704b: the AC sends the user subscription information to the AP by means of CAPWAP or TR-069.

2. When the WLAN device is the AP, the way includes:

Step 704: the BNG sends the changed user subscription information to the AP through the Radius CoA message or the Diameter CCA message;

Step 705: the AP configures according to the user subscription information; specifically, the AP performs a bandwidth and priority configuration of an air interface according to the user subscription bandwidth and priority.

In this case, there is no need to conduct key negotiation.

Figure 8:
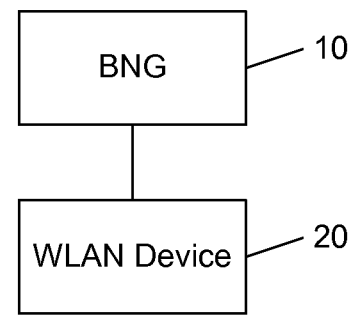
FIG. 8 is a structural diagram of a system for a WLAN user to access a fixed network in an embodiment of the present disclosure.

For implementing the above method, the present disclosure also provides a system for a WLAN user to access a fixed network; as shown in FIG. 8, the system includes: a BNG 10 and a WLAN device 20;

the BNG 10 is configured to, after the WLAN user authentication is successful, send the obtained user subscription information to the AP;

the WLAN device 20 is configured to perform related configuration according to the user subscription information.

Wherein, the BNG 10 is further configured to, after the WLAN user authentication is successful, send the user subscription information to the WLAN user terminal through the EAP authentication success message while sending the obtained user subscription information to the WLAN device.

When the WLAN device 20 is the AC, the BNG 10 is further configured to confirm the AC to which the WLAN user terminal belongs, and send the user subscription information to the AC through the Radius CoA message or the Diameter CCA message;

the AC is configured to send the user subscription information to the AP by means of CAPWAP or TR-069;

or, when the WLAN device 20 is the AP, the BNG 10 is further configured to confirm the AP to which the WLAN user terminal belongs, and send the user subscription information to the AP through the Radius CoA message or the Diameter CCA message.

The BNG 10 is further configured to confirm the AC or the AP to which the WLAN user terminal belongs through the MAC address of the WLAN user terminal and/or the user side logical interface or physical port information of the BNG.

The AP is further configured to perform a bandwidth and priority configuration of an air interface according to the user subscription bandwidth and priority in the user subscription information, and conduct key negotiation with the WLAN user terminal according to the encryption key in the user subscription information to obtain the encryption key PTK; wherein, the encryption key is the PSK or the PMK.

After the user subscription information is changed, when the WLAN device 20 is the AC, the BNG 10 is further configured to send the changed user subscription information to the AC through the Radius CoA message or the Diameter CCA message;

the AC is further configured to send the user subscription information to the AP by means of CAPWAP or TR-069; or, when the WLAN device 20 is the AP, the BNG 10 is further configured to send the changed user subscription information to the AP through the Radius CoA message or the Diameter CCA message.

The above is only the preferred embodiment of the present disclosure and not intended to limit the scope of the claims of the present disclosure.

What is claimed is:

1. A method for a Wireless Local Area Network (WLAN) user to access a fixed network, comprising:
    after the WLAN user is authenticated successfully, receiving, by a Broadband Network Gateway (BNG), an authentication success message from an Authentication, Authorization and Accounting (AAA) server; wherein the authentication success message carries user subscription information;
    obtaining, by the BNG, the user subscription information from the authentication success message, and sending the obtained user subscription information to a WLAN device; and
    after the WLAN device performs related configuration according to the user subscription information, accessing, by a WLAN user terminal, a network;
    wherein the WLAN device is an Access Controller (AC) or an Access Point (AP);
    when the WLAN device is the AC, the step of sending, by the BNG, the obtained user subscription information to the WLAN device comprises: confirming, by the BNG, the AC to which the WLAN user terminal belongs, and sending the user subscription information to the AC through a Radius CoA message or a Diameter CCA message; and sending, by the AC, the user subscription information to the AP by means of Control And Provisioning of Wireless Access Points Protocol (CAPWAP) or Technical Report-069 (TR-069); or
    when the WLAN device is the AP, the step of sending, by the BNG, the obtained user subscription information to the WLAN device comprises: confirming, by the BNG, the AP to which the WLAN user terminal belongs, and sending the user subscription information to the AP through the Radius CoA message or the Diameter CCA message;
    wherein after the WLAN user terminal accesses the network, the method further comprises:
    accessing, by the WLAN user terminal, a portal server, and changing the user subscription information on line:
    sending, by the portal server, the changed user subscription information to the AAA server: and
    sending, by the AAA server, the changed user subscription information to the BNG through the Radius CoA message or the Diameter CCA message.

2. The method according to claim 1, wherein before the authentication of the WLAN user, the method further comprises:
    configuring the BNG as an authentication server end, and configuring the WLAN device as an authentication client end.

3. The method according to claim 1, wherein after the WLAN user is authenticated successfully, while the BNG sends the obtained user subscription information to the WLAN device, the method further comprises:
    sending, by the BNG, the user subscription information to the WLAN user terminal through an Extensible Authentication Protocol (EAP) authentication success message.

4. The method according to claim 1, wherein the step of confirming, by the BNG, the AC or the AP to which the WLAN user terminal belongs comprises:
    confirming, by the BNG, the AC or the AP to which the WLAN user terminal belongs through a Media Access Control (MAC) address of the WLAN user terminal and/or user side logical interface or physical port information of the BNG.

5. The method according to claim 4, wherein the step of performing, by the WLAN device, related configuration according to the user subscription information comprises:
    the AP performs a bandwidth and priority configuration of an air interface according to a user subscription bandwidth and a priority in the user subscription information; and the AP and the WLAN user terminal conduct a key negotiation according to an encryption key in the user subscription information to obtain an encryption key PTK;
    the encryption key is a Pre-shared Key (PSK) or a Pairwise Master Key (PMK).

6. The method according to claim 1, wherein after the WLAN device performs related configuration according to the user subscription information, the method further comprises:
    applying to, by the WLAN user terminal, the BNG for an IP address through a Dynamic Host Configuration Protocol (DHCP) protocol, and accessing a network after obtaining the IP address; or,
    before the authentication of the WLAN user, the method further comprises: applying to, by the WLAN user terminal, the BNG for an IP address through the DHCP protocol.

7. The method according to claim 1, further comprising: sending, by the BNG, the changed user subscription information to the WLAN device, comprising:
    when the WLAN device is the AC, sending, by the BNG, the changed user subscription information to the AC through the Radius CoA message or the Diameter CCA message; and sending, by the AC, the user subscription information to the AP by means of CAPWAP or TR-069; or when the WLAN device is the AP, sending, by the BNG, the changed user subscription information to the AP through the Radius CoA message or the Diameter CCA message.

8. A system for a Wireless Local Area Network (WLAN) user to access a fixed network, comprising: a WLAN Broadband Network Gateway (BNG) and a WLAN device;
the BNG is configured to, after the WLAN user is authenticated successfully, receive an authentication success message from an Authentication, Authorization and Accounting (AAA) server; wherein the authentication success message carries user subscription information; and
to obtain the user subscription information from the authentication success message, and send the obtained user subscription information to the WLAN device; and
the WLAN device is configured to perform related configuration according to the user subscription information;
wherein when the WLAN device is an Access Controller (AC), the BNG is further configured to confirm the AC to which the WLAN user terminal belongs, and send the user subscription information to the AC through a Radius CoA message or a Diameter CCA message; the AC is configured to send the user subscription information to the AP by means of Control And Provisioning of Wireless Access Points Protocol (CAPWAP) or Technical Report-069 (TR-069); or
when the WLAN device is an Access Point (AP), the BNG is further configured to confirm the AP to which the WLAN user terminal belongs, and send the user subscription information to the AP through the Radius CoA message or the Diameter CCA message;
the system further comprising: the WLAN user terminal, a portal server and the AAA server; wherein the WLAN user terminal is configured to, after the WLAN user terminal accesses the network, access a portal server and change the user subscription information on line;
the portal server is configured to send the changed user subscription information to the AAA server; and
the AAA server is configured to send the changed user subscription information to the BNG through the Radius CoA message or the Diameter CCA message.

9. The system according to claim 8, wherein,
the BNG is further configured to, after the WLAN user is authenticated successfully, send the user subscription information to the WLAN user terminal through an Extensible Authentication Protocol (EAP) authentication success message while sending the obtained user subscription information to the WLAN device.

10. The system according to claim 8, wherein,
the BNG is further configured to confirm the AC or the AP to which the WLAN user terminal belongs through a Media Access Control (MAC) address of the WLAN user terminal and/or user side logical interface or physical port information of the BNG.

11. The system according to claim 10, wherein,
the AP is further configured to perform a bandwidth and priority configuration of an air interface according to a user subscription bandwidth and a priority in the user subscription information, and conduct a key negotiation with the WLAN user terminal according to an encryption key in the user subscription information to obtain an encryption key PTK;
the encryption key is a Pre-shared Key (PSK) or a Pairwise Master Key (PMK).

12. The system according to claim 11, wherein, after the user subscription information is changed,
when the WLAN device is the AC, the BNG is further configured to send the changed user subscription information to the AC through the Radius CoA message or the Diameter CCA message; the AC is further configured to send the user subscription information to the AP by means of CAPWAP or TR-069; or
when the WLAN device is the AP, the BNG is further configured to send the changed user subscription information to the AP through the Radius CoA message or the Diameter CCA message.

* * * * *